United States Patent [19]

Tjon-Joe-Pin et al.

[11] Patent Number: 5,566,759
[45] Date of Patent: Oct. 22, 1996

[54] METHOD OF DEGRADING CELLULOSE-CONTAINING FLUIDS DURING COMPLETIONS, WORKOVER AND FRACTURING OPERATIONS OF OIL AND GAS WELLS

[75] Inventors: Robert M. Tjon-Joe-Pin; Brian B. Beall, both of Houston, Tex.

[73] Assignee: BJ Services Co., Houston, Tex.

[21] Appl. No.: 370,075

[22] Filed: Jan. 9, 1995

[51] Int. Cl.$^6$ .............................. E21B 43/25; E21B 43/26
[52] U.S. Cl. ........................ 166/300; 166/278; 166/308; 507/201; 507/215; 507/216
[58] Field of Search .................................. 166/278, 300, 166/308; 507/201, 214, 215, 216

[56] References Cited

U.S. PATENT DOCUMENTS

| | | | |
|---|---|---|---|
| 5,067,566 | 11/1991 | Dawson | 106/308 |
| 5,165,477 | 11/1992 | Shell et al. | 166/300 X |
| 5,201,370 | 4/1993 | Tjon-Joe-Pin | 166/300 |
| 5,224,544 | 7/1993 | Tjon-Joe-Pin et al. | 166/295 |
| 5,226,479 | 7/1993 | Gupta et al. | 166/300 |
| 5,247,995 | 9/1993 | Tjon-Joe-Pin et al. | 166/312 |
| 5,421,412 | 6/1995 | Kelly et al. | 166/300 |
| 5,441,109 | 8/1995 | Gupta et al. | 166/300 |

FOREIGN PATENT DOCUMENTS

WO91/18974  12/1991  WIPO.

*Primary Examiner*—George A. Suchfield
*Attorney, Agent, or Firm*—Arnold, White & Durkee

[57] ABSTRACT

A method is shown for reducing the viscosity of a cellulose-containing fluid used during workover, fracturing or well completion operations. An enzyme system is used to degrade the polymer, whereby the fluid can be removed from the subterranean formation to the well surface. The enzyme systems are effective over broad pH and temperature ranges.

22 Claims, No Drawings

METHOD OF DEGRADING CELLULOSE-CONTAINING FLUIDS DURING COMPLETIONS, WORKOVER AND FRACTURING OPERATIONS OF OIL AND GAS WELLS

BACKGROUND OF THE INVENTION

1. Field of the Invention

The present invention relates to an improved method to degrade cellulose-containing fluids of the type used during completion, workover and fracturing operations at moderate to high temperatures or at an alkaline pH range.

2. Description of the Prior Art

Cellulose-containing fluids are used downhole in a number of wellbore operations, such as workover, gravel packing, and cementing. During hydraulic fracturing, another type of wellbore operation, a sand laden fluid is injected into a wellbore under high pressure. Once the natural reservoir pressures are exceeded, the fracturing fluid initiates a fracture in the formation which generally continues to grow during pumping. The treatment design generally requires the fluid to reach maximum viscosity as it enters the fracture which affects the fracture length and width. This viscosity is normally obtained by the gelation of suitable polymers, such as a suitable polysaccharide, and are known as fracturing gels. The gelled fluid can be accompanied by a propping agent which results in the placement of the propping agent within the fracture thus produced. The proppant remains in the produced fracture to prevent the complete closure of the fracture and to form a conductive channel extending from the wellbore into the formation being treated once the fracturing fluid is recovered. Propping agents include a wide variety of material and may be coated with resins. The gel fluids may also contain other conventional additives common to the well service industry such as surfactants, and the like.

Occasionally, production from wellbore operations must cease temporarily to perform auxiliary procedures called workover operations. The use of temporary blocking gels, also formed by gelation of appropriate polysaccharides, produces a relatively impermeable barrier across the production formation.

Polysaccharides have other uses within the oil industry. For example, uncrosslinked cellulose-containing polysaccharides thicken fluids and control fluid loss. They are used with proppants, such as sand control fluids and completion fluids, such as those for gravel packing.

Gravel packing controls sand migration from unconsolidated or poorly consolidated formations through the placement of a gravel pack around a slotted or perforated liner or screen liner inserted at a specific location within a perforated wellbore. The "gravel" is usually sand or a very fine gravel that excludes the formation sand from entering the wellbore. Celluloses are typically used to thicken the fluids in order to properly pack gravel into the perforations of the wellbore. Although unthickened slurries pack an annulus well, the sand compacts quickly and may not have sufficient time to 'flow into and completely pack the perforations.

The viscosity of all of these types of cellulose-containing fluids, whether crosslinked or not, must be reduced at the end of the operation. At the end of fracturing or workover operations for example, the gels are degraded and the fluids are recovered. Gel fluids are recovered by reducing the viscosity of the fluid to a low value such that it flows naturally from the formation under the influence of formation fluids and pressure. This viscosity reduction or conversion of gels is referred to as "breaking" and is often accomplished by incorporating chemical agents, referred to as breakers, into the initial gel.

A similar reduction of the fluid viscosity of uncrosslinked, cellulose-containing fluids occurs at the end of completion operations. For example, at the end of gravel packing, the viscosity is reduced to allow the settlement of the sand to properly pack the annulus. Therefore in this disclosure, "breaking" refers to the reduction of viscosity of a cellulose-containing fluid, whether crosslinked or uncrosslinked, to a low value such that it flows from the formation under the influence of formation fluids and pressure.

In addition to the importance of providing a breaking mechanism for the fluid which facilitates recovery of the fluid and resumes production, the timing of the break is of great importance. Gels that break prematurely can damage the production zone through the leak-off of contaminating materials into the production formation. If the viscosity is reduced prematurely during gravel packing, the sand settles before being properly placed within the wellbore and perforations, thus contributing to the problem of sand within the wellbore.

On the other hand, fluids that break too slowly can cause slow recovery of the fluid from the production formation. Slow recovery delays the resumption of the production of formation fluids and can cause improper packing the annulus during gravel packing. Incomplete gel degradation causes a build up of residue which interferes with production from the formation.

For purposes of the present application, premature breaking means that the viscosity diminishes to an undesirable extent prior to the end of the operation. Thus, to be satisfactory, the fluid viscosity should remain in the range from about 60% to 100% for the length of time required to complete the operation. Since some operations require extended periods of time before completion, the fluids should be capable of remaining appropriately viscous during that time period. In the laboratory setting, viscosity is measured using a rotational viscometer such as a Fann 35VG meter or a Brookfield DVII digital viscometer.

For practical purposes, the viscosity of the cellulose-containing fluid should be completely reduced within a specific period of time after completion of the operation. This period of time depends on the temperature of the formation. Optimally, a gelled fluid breaks when the operation concludes. A completely reduced fluid means one that can be flushed from the formation by the flowing formation fluids. A completely broken, uncrosslinked gel regains greater than about 95% of the initial permeability of a formation sample using a gel damage permeability test.

Enzyme systems are known to degrade the types of polysaccharides used in fracturing and blocking gels as well as other oil industry applications. Enzyme breaker systems have been designed to break gelled fracturing and blocking fluids used in the industry as well as filter cakes. See, for example, U.S. Pat. No. 5,224,544 "Enzyme Complex Used for Breaking Crosslinked Cellulose Based Blocking Gels at Low to Moderate Temperatures" and U.S. Pat. No. 5,247,995, "Method of Dissolving Organic Filter Cake Obtained from Polysaccharide Based Fluids Used in Production Operations and Completions of Oil and Gas Wells", assigned to the assignee of this invention and incorporated herein by reference. The cellulose enzyme treatment disclosed in these patents effectively degrades cellulose-containing fluids at moderate conditions. The cellulose enzymes degrade specific cellulose linkages at pH ranges from about 1.0 to about 8.0, with an optimum pH ranging from about 3.0 to 4.0 at low to moderate temperatures of about 10° C. (50° F.) to about 60° C. (140° F.). However, the disclosed enzyme treatment is less effective at pHs above about 8, as well as temperatures above about 60° C. (140° F.). Like most enzymes, the efficacy of the above-disclosed enzyme system is reduced at pHs at the high end of the activity range, in this case between about 7 and 8, while the stability and activity of the enzymes decreases at the higher temperatures.

Therefore, the present invention has as its object to provide a mechanism for degrading cellulose-containing fluids used during fracturing, workover and completion operations to produce an efficacious degradation of the cellulose-containing fluid at an alkaline pH range. In addition, the present invention has as its object the ability to effectively degrade cellulose-containing fluids at moderate to high temperatures.

Another object of the invention is to provide an enzyme system that degrades the cellulose-containing fluids into primarily monosaccharide and disaccharide fragments at alkaline pH ranges and moderate to high temperatures.

Another object of the invention is to provide a mechanism for degrading cellulose-containing fluids at alkaline pH ranges and moderate to high temperatures that does not react with other materials or metals used in wellbore operations or found within the subterranean formation.

SUMMARY OF THE INVENTION

In the method of the invention, a cellulose-containing fluid is degraded and removed from within a subterranean formation surrounding a wellbore. A cellulose-containing fluid is made by blending together an aqueous fluid and a cellulose-containing hydratable polymer. When crosslinking is desired, a suitable crosslinking agent is also incorporated into the fluid. An enzyme breaker or system which is effective to degrade the cellulose-containing fluid at a pH ranging from about 8 to about 11 is either incorporated internally within the fluid, externally applied to the fluid or a mixture of both. In the alternative, an enzyme system degrades the cellulose-containing fluid at moderate to high temperatures between about 60° C. (140°) and 121° C. (250° F.).

Preferably for fracturing, completion and workover operations, a cellulose-containing gellable fluid is formulated by blending together the aqueous fluid, cellulose-containing hydratable polymer, and crosslinking agent for crosslinking the hydratable polymer. If an enzyme system is incorporated internally, the enzyme system is added at this step. The fluid is pumped to a desired location within the wellbore and allowed to crosslink or set. After completing the operation, the enzyme breaker degrades the polymer. Prior to degradation an external treatment may be applied whether or not an internal breaker was previously incorporated. After degradation the fluid can be pumped from the subterranean formation to the well surface. The enzyme system effectively attacks only specific linkages in the crosslinked cellulose gel.

For operations that do not require crosslinked fluids, a cellulose-containing fluid is formulated by blending together the aqueous fluid and a cellulose-containing hydratable polymer. If the enzyme breaker is incorporated internally, the enzyme breaker is added at this step. The fluid is then pumped to a desired location within the wellbore. Prior to degradation an external treatment may be applied whether or not an internal enzyme breaker was previously incorporated. After completing the operation, the enzyme system degrades the polymer. After degradation the fluid can be pumped from the subterranean formation to the well surface. The enzyme system effectively attacks only specific linkages in the cellulose-containing fluid.

In a particularly preferred method for practicing the invention at a higher pH range, the cellulose-containing fluid contains polysaccharides with repeating units of glucose linked in a (1,4)β-D-glucosidic linkages or repeating units of glucose with (1,4)β-D-glucosidic linkages. Generally, the pH of the enzyme system is between about 5 to about 11, more preferably between about 8 to about 11, with temperatures ranging from about 50° F. to about 160° F. Most preferably the enzyme system for a cellulose-containing polysaccharide has an optimum pH of about 9.5 with the temperature between about 80° F. and 160° F. For those treatments used at moderate to high temperature ranges, the pH of the enzyme breaker is between about 2 to about 8. The temperatures generally range from about 150° F. to about 250° F. for such cases. Most preferably the enzyme breaker has an optimum temperature of about 200° F. with the optimum pH between about 3 and 4 for moderate to high temperature ranges.

The invention provides a method to effectively degrade cellulose-containing fluids used during fracturing, workover and completion operations at a higher pH range or temperature range. The cellulose-containing fluids are degraded into primarily monosaccharide and disaccharide fragments and the enzyme system does not react with other materials or metals used in wellbore operations or found within the subterranean formation.

Additional objects, features and advantages will be apparent in the written description which follows.

DETAILED DESCRIPTION OF THE INVENTION

The improved method of the invention degrades cellulose-containing fluids, such as fracturing or blocking gels, frac packs, gravel packing fluids and cementing fluids, at a higher pH range or temperature range. A cellulose-containing polysaccharide fluid consists of a hydratable polymer blended into an aqueous fluid. The aqueous fluid could be, for example, water, brine, aqueous based foams or water-alcohol mixtures. The hydratable polymer useful in the present invention can be any of the hydratable cellulose-containing polysaccharides familiar to those in the well service industry. For instance, suitable hydratable polymers are the cellulose and cellulose derivatives. The preferred polysaccharides are cellulose, carboxymethyl cellulose, carboxymethyl hydroxyethyl cellulose and hydroxyethyl cellulose. The most preferred polysaccharides are hydroxyethyl cellulose and carboxymethyl hydroxyethyl cellulose. The hydratable polymer is added to the aqueous fluid in the range from about 0.1% to about 2.0%, depending upon the fluid type, with the most preferred concentration range for the present invention about 0.5% to about 1.5% by weight for crosslinked gels and about 0.1% to about 1.5% by weight for uncrosslinked fluids.

Many of these polysaccharides gel in the presence of a crosslinking agent to form a gelled based fluid. Therefore in addition to the hydratable polymer, the cellulose-containing fluids of the invention may include a crosslinking agent. The crosslinking agent can be any of the conventionally used crosslinking agents which are known to those skilled in the art. For gels at lower pH ranges, transition metals are preferred, with zirconium crosslinking agents most preferred. For gels at higher pH ranges, zirconium crosslinkers are preferred.

For zirconium crosslinkers, the crosslinking agent is any material which supplies zirconium ions in solution. Thus the crosslinking agent can be any convenient source of zirconium ions. A preferred crosslinking additive is sodium zirconium lactate. This crosslinking additive is preferably present in the range from about 0.01% to about 0.75% by weight of the aqueous fluid. Preferably, the concentration of crosslinking agent is in the range from about 0.1% to about 0.2% by weight of the aqueous fluid.

The method of the invention reduces the viscosity of nondamaging, uncrosslinked cellulose-containing polysaccharides used in the oil industry as well. Polysaccharides, such as cellulose are often used as sand control agents in gravel packing. These fluids are dense viscous fluids that decrease the flow of formation fluids. Therefore in this disclosure, the term "cellulose-containing fluid" refers to polysaccharide containing fluids, whether crosslinked or uncrosslinked, that are made from derivatized or underivatized cellulose and are characterized by repeating units of D-glucose linked together by $(1,4)\beta$-D-glucosidic linkages.

The present invention provides enzyme systems that are particularly well adapted for use with cellulose-containing fluids at higher pHs and temperatures. The enzyme systems are highly specific enzymes which, for all practical purposes, completely degrade the cellulose backbone of the fluid.

The enzymes of the invention are hydrolases. For the high pH application, the enzymes are active and stable in the pH range of about 5 to 11, preferably from about 9 to about 10, with the optimum pH about 9.5. These same enzymes are active at low to moderate temperatures of about 10° C. (50° F.) to 71° C. (160° F.). For moderate to high temperature applications, the selected enzymes are active and stable in the temperature range of about 60° C. (140° F.) to about 121° C. (250° F.), preferably about 60° C. (140° F.) to about 93° C. (200° F.), with the optimum temperature about 93° C. (200° F.).

Depending on the conditions of the procedure and the type of operations in which the fluid is used, the enzymes can be internally incorporated in the fluid, externally applied to the fluid or a mixture of both. For crosslinked blocking gels, the preferred method of using the enzyme treatment is the internal incorporation of enzyme treatment with an external application of enzyme treatment. For fracturing gels and uncrosslinked fluids, the preferred method of application is the internal incorporation of the enzyme treatment. For gravel packing operations, the enzyme system is preferably incorporated internally in the fluid.

Using cellulose or derivatized cellulose, the specific enzyme system uses enzymes to attack the $\beta$-glucosidic linkages specifically the $(1,4)\beta$-D-glucosidic linkages of the cellulose backbone, thus breaking the backbone into fragments. The fragments are broken down primarily into D-glucose monosaccharides and disaccharides. The preferred enzyme breaker is any enzymes or combination of enzymes that attack the glucosidic linkages of the cellulose polymer backbone and degrade the polymer into mostly monosaccharide and disaccharide units, such as cellulase, hemicellulase, endo-glucosidase, exo-glucosidase, endo-xylanase, exo-xylanase and the like. The two preferred enzymes are commonly called exo and endo glucosidases. The preferred enzymes for this cellulose-containing system specifically hydrolyze the exo$(1,4)\beta$-D-glucosidic and the endo$(1,4)\beta$-D-glucosidic linkages between the monosaccharide units in the cellulose backbone and the $(1,4)\beta$-D-glucosidic linkage of cellulose.

The preferred glucosidases for the high pH applications are commercially available cellulases supplied by Novo Nordisk of Denmark as "SP-359." The preferred enzyme is a mixture a 1:4 (weight/weight [w/w]) solution of exo$(1,4)$-$\beta$-D-cellulase and endo$(1,4)$-$\beta$-D-cellulase. This product is a light brown liquid with a slight fermentation odor. It has a specific gravity of 1.2, a boiling point of 100°–105° C. and has a pH of 6.9 at 25° C. It is 100% soluble in water.

The preferred glucosidases for the moderate to high temperature applications are commercially available from Novo Nordisk as "SP-476" and from Benchmark Research and Technology of Midland, Tex., as "HTL-26." The HTL-26 product is a clear to light straw colored liquid having a specific gravity of 1.01 and a pH of 5.7. It is 100% soluble in water. The preferred enzyme mixture is a 1:4 (weight/weight [w/w]) solution of exo$(1,4)$-$\beta$-D-cellulase and endo$(1,4)$-$\beta$-D-cellulase.

If the enzyme breaker is incorporated internally within the viscous fluid, the cellulases should be present in the range from about 0.1% to about 1.0% by volume, based on the total volume of aqueous fluid. If the enzyme is applied externally, then the cellulase mixture should be used in the range from about 10% to 100% based on the total volume of fluid applied most preferably at least 50%. If the enzymes are used both internally and externally, then the cellulase mixture should be used in the range of 0.1% to 1.0% internally and 10% and 100% externally. External applications are pumped through the tubing to the location of the fluid within the production zone, which evenly disperses the enzymes for the best results.

Unexpectedly, this combination of enzymes degrades the cellulose-containing fluid into a solution of mostly monosaccharide and disaccharide units with molecular weights from about 180. "Mostly monosaccharide and disaccharide units" means that the gel polymer backbone is reduced to a solution of more than about 90% monosaccharide and disaccharide units, preferably more than about 95%. Adding additional enzymes or oxidants to this system substantially decreases the effect of the enzyme treatment of the invention on the cellulose backbone.

In a typical blocking gel operation, the blocking gel fluid is pumped at a rate sufficient to coat the formation. A typical blocking gel treatment would be conducted by hydrating a 50 to 120 pounds per 1000 gallons of fluid (ppt) cellulose-containing polymer, such as cellulose, in a light to a heavy brine, for example fresh water to a 14.5 pounds per gallon (ppg) $CaCl_2/CaBr_2$. The pH of the fluids are adjusted through the use of a suitable buffer, acid or base, for instance, hydrochloric acid or sodium hydroxide.

Gravel packing operations are well known in the art. See, e.g., U.S. Pat. No. 5,251,699. In a typical gravel packing operation, a viscous slurry of uncrosslinked cellulose-containing carrier fluid and sand is pumped to a location where a section of the wellbore has been previously perforated. The slurry both suspends the sand and prevents premature settling and is preferably shear-thinning and temperature insensitive. Shear-thinning permits pumping the viscous slurry while the sand particles remain suspended. Temperature insensitivity prevents premature settling out due to viscosity changes as the slurry passes through the drill pipe.

The enzyme system can be incorporated in the slurry at any time. The enzyme system can be either incorporated in the carrier fluid before adding the sand or added to the sand slurry, for example, "on the fly" while pumping the slurry into the formation. Preferred amounts of enzyme breaker are about 0.1% to about 1.0% by weight of carrier fluid.

Cellulose and its derivatives are typically added to the carrier fluid to produce a viscosity of between about 30 and 600 centipoise at a shear rate of about 100 $s^{-1}$ at the temperature of the wellbore to be packed. The fluid can be any of the fluids usually used in gravel packing.

The sand retains formation sand without filtering through the liner. One type of sand typically used filters through a 40 mesh screen while a 60 mesh screen retains the sand (40×60 mesh). Other sands include 20×40 and 50×70 mesh. Generally, 0.5 to 5 pounds of sand are suspended per gallon of carrier fluid, with about 0.5 to about 3 pounds per gallon of fluid preferred and about 3 ppg fluid especially preferred.

A gravel packing or crossover tool and a slotted liner or screen liner are inserted into the perforated section of the wellbore. The crossover tool is placed above the liner and communicates directly with the annulus surrounding the liner. The crossover tool communicates from the inside of a workstring to the wellbore surrounding the liner. The sand slurry passes through the crossover tool to the annulus surrounding the workstring. The wellbore above the crossover tool surrounding the workstring and the wellbore surrounding the liner below the crossover tool are usually separated by a packer associated with the crossover tool. The liner has narrow slots that allow carrier fluid to flow into the liner while filtering out the sand. In the alternative, a screen liner or wire wrapped screen has wires wrapped around the pipe separated by distances equivalent to the width of the slots.

After the liner is suspended in the wellbore within the portion of the wellbore to be packed, the slurry of sand and carrier fluid is pumped through the workstring, the crossover tool and into the annulus and perforations. The deposited sand settles for at least one hour before the crossover tool is disconnected from the liner and lifted out of the wellbore. A production tubing is then lowered into the wellbore and connected to the liner.

For good gravel packing of both the annulus surrounding the screen and the perforations, the carrier fluid must leak both into the formation and into the liner. The percent of the carrier fluid that returns to the surface through the liner is generally referred to as the return rate. This return rate is preferably between about 20% and about 85%, more preferably between about 50 to about 70%.

The optimum velocity of the slurry in the annulus before leak-off depends on the angle from vertical of the wellbore being packed. Generally, higher velocities are preferred for more horizontal wellbores than for more vertical wellbores. For a horizontal wellbore, the slurry velocity, before any leakoff, is preferably about 2 to 3 ft/s. A wellbore that is about 40° to 0° from vertical is preferably packed with a slurry velocity of about 1 to 2 f/s prior to leak-off. A wellbore at about 64° from vertical is preferably packed with a slurry velocity of about 2 ft/s.

The following examples are intended to illustrate and not limit the invention:

Cellulose Specific Enzyme - High pH System
30 PPT Hydroxyethyl cellulose polymer
pH - 9.5
Temperature - 75° F.
Viscosity measured with a Fann 35A viscometer @ 300 RPM
Viscosity @ 1500 minutes obtained by Cannon-Fenske viscometer

| TIME (min) | ENZYME BREAKER LOADING (GPT) | | | |
|---|---|---|---|---|
| | 0 | .1 | .5 | 1.0 |
| | VISCOSITY (CPS) @ 511 $sec^{-1}$ | | | |
| 0 | 34 | 34 | 34 | 34 |
| 100 | 27 | 14 | 7 | 5 |
| 150 | 26.5 | 11.5 | 6.5 | 4.5 |
| 200 | 26 | 9 | 6 | 4 |
| 300 | 26 | 8 | 4.5 | 3 |
| 400 | 25 | 5 | 4 | 2 |
| 1500 | 25 | 1.82 | 1.12 | 1.08 |

Cellulose Specific Enzyme - High Temperature System
80 PPT Hydroxyethyl cellulose (HEC) (Linear Gel)
40 PPT Carboxymethylhydroxyethyl cellulose (CMHEC)
(Crosslinked Gel)
Temperature - 200° F.
Viscosity measured using Fann 50C viscometer

| TIME (HOURS) | VISCOSITY (cps) @ 40 $sec^{-1}$ FLUID SYSTEM | | | |
|---|---|---|---|---|
| | 40 PPT CMHEC (BASE-LINE) | 40 PPT CMHEC ENZYME BREAKER | 80 PPT HEC (BASE-LINE) | 80 PPT HEC ENZYME BREAKER |
| 0 | 1304 | 1107 | 552 | 458 |
| 1 | 1000 | 491 | 164 | 45 |
| 2 | 947 | 332 | 157 | 41 |
| 3 | 850 | 199 | 154 | 37 |
| 4 | 792 | 141 | 145 | 32 |
| 5 | 731 | 99 | 130 | 22 |
| 6 | 578 | 56 | 120 | 16 |
| 7 | 437 | 49 | 115 | 13 |
| 8 | 349 | 42 | 100 | 11 |
| 9 | 304 | 9 | 97 | 9 |

GPT - gallons of enzyme per thousand gallons of aqueous fluid
CPS - centipoise
PPT - pounds per thousand The use of a Gel Damage Permeability Test assesses the recovery of permeability of the pore after degradation of the gel fluid polymer. For this test, a test core is drilled from a sandstone formation sample. The dimensions of the core are carefully measured. The cross sectional area (A) and the length of the core (L) are recorded.

The core is then placed in a solution of a light brine which will be used to simulate a formation brine. The light brine can be made of potassium chloride, sodium chloride, calcium chloride, magnesium chloride, or a combination of these or any salt which would be determined from an analysis of actual formation water. The core is vacuum saturated in the brine. The core is then placed in a core holder. The core and core holder is then placed in a core test apparatus such as a Hassler Core Test Cell. This apparatus allows pressure to be applied in a radial and an axial direction. The top and bottom of the core are exposed to the flow of the brine.

The brine is then flowed through the core by using a pump or a pressure drive system. The Rate of flow (Q) in units/time and the pressure (P) in psi are recorded. The permeability of the core is then calculated using Darcy's equation:

$$K = \frac{Q\mu L}{A\Delta P}$$

where $\mu$ is the viscosity measured in centipoises and K is the permeability in darcies.

The direction of the initial flow of the brine through the core is the production direction. The direction of flow is reversed to stimulate injection of a fluid into a well. This is termed "injection direction." The permeability is again calculated using Darcy's equation. The two values are used to calculate percent damage.

| FLUID SYSTEM | pH | TEMP °F. | INITIAL K | K AFTER INJECTING GEL | REGAIN K/(%) @ 2 HRS | REGAIN K/(%) @ 4 HRS |
|---|---|---|---|---|---|---|
| 100 PPT CMHEC | 4.0 | 175 | 10.88 | 0.0 | 8.12 (74.6%) | 10.71 (98.4%) |
| 40 PPT HEC | 9.5 | 100 | 7.90 | 0.0 | 6.80 (86.1%) | 7.86 (99.5%) |

K - PERMEABILITY (md)
(%) - PERCENT REGAINED PERMEABILITY

An invention has been shown with a number of advantages. The improved methods of the invention degrade cellulose-containing fluids used during fracturing, workover and completion operations at a higher pH range, as well as at moderate to high temperatures.

The improved methods of the invention degrade the cellulose-containing fluids into primarily monosaccharide and disaccharide fragments at conditions hostile to enzymes. These conditions are alkaline pH ranges and moderate to high temperatures.

The enzyme systems of the invention degrade cellulose-containing fluids at alkaline pH ranges and moderate to high temperatures without reacting with other materials or metals used in wellbore operations or found within the subterranean formation.

What is claimed is:

1. A method of reducing the viscosity of a cellulose-containing fluid used during workover, fracturing or completion operations and found within a subterranean formation which surrounds a completed wellbore comprising the steps of:

formulating the cellulose-containing fluid by blending together an aqueous fluid, a cellulose-containing hydratable polymer, and an enzyme system;

pumping the cellulose-containing fluid to a desired location within the wellbore;

allowing the enzyme treatment to degrade the polymer, whereby the fluid can be removed from the subterranean formation to the well surface; and wherein the enzyme treatment has activity in the pH range of about 9 to about 11 and effectively attacks β-D-gluocosidic linkages in the hydratable polymer.

2. The method of claim 1, wherein the cellulose-containing fluid further contains a suitable crosslinking agent for crosslinking the hydratable polymer to form a polymer gel.

3. The method of claim 2, wherein the cellulose-containing hydratable polymer has repeating units of D-glucose linked by (1,4)β-D-glucosidic linkages and the enzyme system is specific to attack the (1,4)β-D-glucosidic linkages.

4. A method of reducing the viscosity of a cellulose-containing fluid used during workover, fracturing or completion operations and found within the subterranean formation which surrounds a completed wellbore comprising the steps of:

formulating the cellulose-containing fluid by blending together an aqueous fluid, a cellulose-containing hydratable polymer, and an original source of an enzyme system;

pumping the cellulose-containing fluid to a desired location within the wellbore;

applying additional enzyme system to the cellulose-containing fluid;

allowing the enzyme system to degrade the polymer, whereby the fluid can be removed from the subterranean formation to the well surface; and wherein the enzyme system has activity in the pH range of about 9 to about 11 and effectively attacks β-D-glucosidic linkages in the hydratable polymer.

5. The method of claim 4, wherein the cellulose-containing hydratable polymer has repeating units of D-glucose linked by (1,4)β-D-glucosidic linkages and the enzyme system is specific to attack the (1,4)β-D-glucosidic linkages.

6. The method of claim 4, wherein the cellulose-containing fluid further contains a suitable crosslinking agent for crosslinking the hydratable polymer to form a polymer gel.

7. A method of reducing the viscosity of a cellulose-containing fluid used during workover, fracturing or completion operations and found within the subterranean formation which surrounds a completed wellbore comprising the steps of:

formulating the cellulose-containing fluid by blending together an aqueous fluid and a cellulose-containing hydratable polymer;

pumping the cellulose-containing fluid to a desired location within the wellbore;

applying an external enzyme system to the cellulose-containing fluid;

allowing the enzyme system to degrade the polymer, whereby the fluid can be removed from the subterranean formation to the well surface; and wherein the enzyme treatment has activity in the pH range of about 9 to about 11 and effectively attacks β-D-glucosidic linkages in the hydratable polymer.

8. The method of claim 7, wherein the cellulose-containing hydratable polymer has repeating units of D-glucose linked by (1,4)β-D-glucosidic linkages and the enzyme system is specific to attack the (1,4)β-glucosidic linkages.

9. The method of claim 7, wherein the cellulose-containing fluid further contains a suitable crosslinking agent for crosslinking the hydratable polymer to form a polymer gel.

10. A method of reducing the viscosity of a cellulose-containing fluid used during workover, fracturing or completion operations and found within the subterranean formation which surrounds a completed wellbore comprising the steps of:

formulating the cellulose-containing fluid by blending together an aqueous fluid, a cellulose-containing hydratable polymer, and an enzyme system;

pumping the cellulose-containing fluid to a desired location within the wellbore;

allowing the enzyme system to degrade the polymer, whereby the fluid can be removed from the subterranean formation to the well surface; and wherein the enzyme system has activity in the temperature range greater than about 60° C. (140° F.) to about 121° C. (250° F.) and effectively attacks β-D-gluocosidic linkages in the hydratable polymer.

11. The method of claim 10, wherein the cellulose-containing hydratable polymer has repeating units of D-glucose linked by (1,4)β-D-glucosidic linkages and the enzyme system is specific to attack the (1,4)β-D-glucosidic linkages.

12. The method of claim 10, wherein the cellulose-containing fluid further contains a suitable crosslinking agent for crosslinking the hydratable polymer to form a polymer gel.

13. The method of claim 10, wherein the enzyme system is specific to attack the β-D-glucosidic linkages of the cross-linked polymer gel to reduce the polymer to a solution principally of cellobiose and glucose.

14. The method of claim 12, wherein the cellulose-containing hydratable polymer has repeating units of D-glucose linked by (1,4)β-D-glucosidic linkages and the enzyme system is specific to attack the (1,4)β-D-glucosidic linkages.

15. A method of reducing the viscosity of a cellulose-containing fluid used during workover, fracturing or completion operations and found within the subterranean formation which surrounds a completed wellbore comprising the steps of:

formulating the cellulose-containing fluid by blending together an aqueous fluid, a cellulose-containing hydratable polymer, and an original source of an enzyme system;

pumping the cellulose-containing fluid to a desired location within the wellbore;

applying additional enzyme system to the cellulose-containing fluid;

allowing the enzyme system to degrade the polymer, whereby the fluid can be removed from the subterranean formation to the well surface; and wherein the enzyme system has activity in the temperature range greater than about 60° C. (140° F.) to about 121° C. (250° F.) and effectively attacks β-D-glucosidic linkages in the hydratable polymer.

16. The method of claim 15, wherein the cellulose-containing hydratable polymer has repeating units of D-glucose linked by (1,4)β-D-glucosidic linkages and the enzyme system is specific to attack the (1,4)β-D-glucosidic linkages.

17. The method of claim 15, wherein the cellulose-containing fluid further contains a suitable crosslinking agent for crosslinking the hydratable polymer to form a polymer gel.

18. A method of reducing the viscosity of a cellulose-containing fluid used during workover, fracturing or completion operations and found within the subterranean formation which surrounds a completed wellbore comprising the steps of:

formulating the cellulose-containing fluid by blending together an aqueous fluid and a cellulose-containing hydratable polymer;

pumping the cellulose-containing fluid to a desired location within the wellbore;

applying an external enzyme system to the cellulose-containing fluid;

allowing the enzyme system to degrade the polymer, whereby the fluid can be removed from the subterranean formation to the well surface; and wherein the enzyme system has activity in the temperature range greater than about 60° C. (140° F.) to about 121° C. (250° F.) and effectively attacks β-D-glucosidic linkages in the hydratable polymer.

19. The method of claim 18, wherein the cellulose-containing hydratable polymer has repeating units of D-glucose linked by (1,4)β-D-glucosidic linkages and the enzyme system is specific to attack the (1,4)β-D-glucosidic linkages.

20. The method of claim 18, wherein the cellulose-containing fluid further contains a suitable crosslinking agent for crosslinking the hydratable polymer to form a polymer gel.

21. The method of claim 20, wherein the enzyme system is specific to attack the β-D-glucosidic linkages of the cross-linked polymer gel to reduce the polymer to a solution principally of cellobiose and glucose.

22. The method of claim 20, wherein the cellulose-containing hydratable polymer has repeating units of D-glucose linked by (1,4)β-D-glucosidic linkages and the enzyme system is specific to attack the (1,4)β-D-gluocosidic linkages.

\* \* \* \* \*